United States Patent

[11] 3,560,702

[72] Inventors Masayasu Arikawa;
Motomi Kano, Fujisawa-shi; Sho Horiuchi,
Kamakura-shi, Japan
[21] Appl No 801,690
[22] Filed Feb. 24, 1969
[45] Patented Feb. 2, 1971
[73] Assignee Kobe Steel Ltd.
Hyogo-ken, Japan
a corporation of Japan
[32] Priority Mar. 2, 1968
[33] Japan
[31] 43/13520

[54] COMPOSITE ELECTRODE FOR CONSUMABLE ELECTRODE ARC WELDING PROCESS
6 Claims, 2 Drawing Figs.

[52] U.S. Cl. .................................................. 219/146
[51] Int. Cl. ..................................................... B23k 35/22
[50] Field of Search ........................................... 219/146;
117/202, 203, 204, 206, 207; 148/24, 26

[56] References Cited
UNITED STATES PATENTS
3,424,892  1/1969  Wilcox ........................ 219/146

Primary Examiner—J. V. Truhe
Assistant Examiner—Lawrence A. Rouse
Attorney—Wenderoth, Lind and Ponack ABSTRACT: A consumable composite electrode of infinite length for use in an automatic arc-welding of steel without shielding gas and the like shielding means comprising a steel sheath and a powdery mixture filled within the sheath and having a specific composition which contributes to the arc-welding of the steel workpiece.

PATENTED FEB 2 1971                                          3,560,702

MASAYASU ARIKAWA,          : INVENTORs
MOTOMI KANO AND SHO HORIUCHI

BY Wenderoth, Lind & Ponack

ATTORNEYS

COMPOSITE ELECTRODE FOR CONSUMABLE ELECTRODE ARC WELDING PROCESS

BACKGROUND OF THE INVENTION

For automatically welding a workpiece such as steel, the so-called gas-shielded arc-welding process in which carbonic acid gas or an inert gas or a mixture thereof is employed as the arc shielding means and the so-called submerged arc-welding process in which a specific flux is employed as the arc shielding means have been known as most practical welding processes. In addition, the so-called electroslag welding process has been also known. These processes are common to each other in the fact that in any of the above-mentioned known automatic welding processes a coiled steel wire of infinite length has been employed as the consumable electrode and the electrode is melted under conditions which shield the electrode from the atmosphere whereby the molten metal from the consumable electrode is transferred to the workpiece to be welded to deposit a metal thereon.

Furthermore, of late, several types of consumable electrode welding processes which do not require any external shielding gas supply source have been proposed and practically employed.

However, the efficiency of any of the above-mentioned known welding processes which necessarily employ a shielding gas is adversely affected by even wind which is blowing at and in the vicinity of the welding zone where the arc is being struck at the velocity on the order of 2m/sec. and a satisfactory weld can not be obtained. This difficulty has been one of most serious drawbacks common to the above-mentioned known welding processes. And according to the submerged arc welding process wherein a welding operation is carried out while supplying a particular flux into the groove or recess provided in the workpiece, the arc being struck can not be externally observed and the welding position is subjected to limitation and therefore, the submerged arc welding process can not be applied to certain locations.

More recently, a consumable electrode welding process which does not require any external shielding gas supply source has been proposed. However, welds formed by such a process very often have too low impact values to make them practically useful. Thus, development of more useful and improved consumable electrodes which do not require shielding gas have been eagerly called for by the art.

One typical arc-welding process which does not require the use of any shielding gas and can be carried out in the open air has been disclosed in U.S. Pat. No. 2,909,778.

The welding process of this U. S. Patent is characterized in that a welding arc being struck is supplied with a killing agent which acts on the molten metal from a consumable electrode and with a killing agent protector which shields the killing agent from oxygen and nitrogen in the air. For use in such a welding process an electrode which comprises a metal the interior of which is filled with a deoxidizer, the killing agent and killing agent protector has been proposed. As the deoxidizer to be employed in such a wire, one or more members selected from the group comprising Mn, Cr, Nb, Ta and V are selectively employed, as the killing agent to be employed in the wire, one or more members selected from the group comprising Zr, Ti, B, Al, Si, Li and Ca are selectively employed and as the killing agent protector to be employed in the wire, one or more members selected from the group comprising aluminum fluoride and halides of alkali or alkaline earch metal are selectively employed. Although the use of the last-mentioned composite wire electrode may form a less porosity deposit metal, the deposit metal often contains a substantial amount of killing agent residue.

When the deposit metal contains a substantial amount of killing agent such as Al, Ti and/or Zr, although these elements can bond with nitrogen as well as oxygen, once AlN, TiN and/or ZrN which have high specific gravities and high melting points have been formed in a welding puddle, the possibility of slagging off for these elements is very rare and they remain in the deposit metal as nonmetal intervenient substances which tend to reduce the ductility of the deposit metal. Therefore, when a deposit metal contains the killing agent such as Ti, Zr, Al, B and/or the like enumerated hereinabove in a substantial amount, the metal has a very low impact value which renders the metal unsuitable for use in constructions which among others require varying high resistances against impact. This is one of the most important reasons for which commercially available conventional welding electrodes have been used to only limited applications.

Another example of arc-welding process which does not require any shielding gas or, if any, requires only a small amount of shielding gas has been disclosed in U. S. Pat. No. 3,118,053. The electrode employed in the welding process of this U.S. patent comprises a composite wire which consists of a metal sheath the interior of which is filled with a welding flux wherein carbonate of lime is present as a gas evolution agent. As the composite wire is melted, the carbonate of lime is pyrolyzed to evolute gas which is to be used as the shielding gas.

However, in such an arc welding process using the composite wire electrode containing the gas evolution agent, since the reaction takes place rapidly in the arc being struck, the arc is disturbed under the influence of the evolving gas and rather increases the amount of nitrogen in the deposit metal.

Furthermore, when the deoxidizer and denitrification agent such as Al, Zr and etc. are used in combination with a carbonate, the C contained in the carbonate is reduced and a portion of the C is liable to be transferred to the deposit metal resulting in reduction of the impact value of the deposit metal.

SUMMARY OF THE INVENTION

One primary object of the present invention is to provide an improved consumable composite electrode for use in an arc-welding of steel which enables the welding process to be carried out in the open air without the use of any shielding gas and which makes it possible to obtain a high quality deposit metal.

Another object of the present invention is to provide an improved consumable composite electrode for use in an arc-welding process of steel which can effectively eliminate the above-mentioned defects inherent to the conventional open-type arc-welding processes.

A still further object of the present invention is to provide an improved consumable composite electrode for use in an arc-welding process which enables the welding process to be carried out in the open air without the use of any shielding gas and which makes it possible to obtain a high quality deposit metal which has excellent X-ray and mechanical properties and especially, a high impact value.

A further object of the present invention is to provide an improved high weldability electrode for use in an arc-welding of steel which enables the welding process to be carried out in the open air with the use of either DC or AC power source.

According to one aspect of the present invention, there is provided a consumable composite electrode which comprises a metal sheath and a powdery flux filled in the interior of the sheath and essentially comprising by weight of the total wire electrode, respectively, 6—11 percent of $CaF_2$, 0.1—1.5 percent of Mn, 0.8—2 percent of Ni and 2—5 percent of Al-Mg alloy containing the total amount of 0.006—0.06 percent of Na and K in the form of chlorides.

In carrying out an arc-welding of steel with the use of the consumable composite electrode according to the present invention, the electrode is continuously fed toward and along the groove or recess provided in the steel workpiece by a suitable feeding means and cooperates with an arc to be struck between the electrode and workpiece in forming a deposit metal in the groove by transferring the molten metal of the electrode to the groove. When the electrode is fed and melted in the manner mentioned above, the ingredients of the flux filled in the interior of the metal sheath of the electrode acts as follows. That is, the $CaF_2$ forms slag which serves as means for enveloping and shaping a welding bead, the Mn serves as the deoxidizer and is added to the deposit metal as one of the alloying elements of the deposit metal, the Ni serves as the so-called austenite former and finally, the Al-Mg alloy effectively serves as the denitrification agent. Thus, these flux ingredients in combination provide a high quality deposit metal under satisfactory welding conditions.

The reason for which Al-Mg alloy is used as the deoxidizer in the novel wire electrode is that when Al and Mg are employed in the form of simple substances in the wire, a substantially amount of spattering will take place which renders the welding process impractical. This is due to the fact that Joule's heat which is generated in the gap between the conductive tip end of the wire and the arcing spot by the current flowing through C. the wire rapidly heats the wire end before the wire end reaches the arcing spot, but in such a case the Mg of the flux is rapidly oxidized to the explosion point. On the contrary, when Al and Mg are contained in the flux in the form of Al-Mg alloy, such a phenomenon will not take place and the conditions of the arc may be substantially improved which enables the welding operation to be conducted with the use of a AC power source. Furthermore, the use of Al-Mg alloy as the deoxidizer in the flux of the novel wire electrode rather than Al and Mg in the form of simple substances reduces the melting point of these ingredients thereby to enhance the deoxidization and denitrification actions of these ingredients. If Mg in the form of simple substance is incorporated in the flux of the wire electrode as the deoxidizer, when the wire is backed at the temperature 380—400° C. in the final step in the production of the wire the oxidization of the Mg is accelerated and the thus produced wire can not have desired properties which are called for such a wire. From the above reason, according to the present invention Al and Mg are employed in the form of Al-Mg alloy. In the novel consumable composite wire electrode the blending ratio of Al to Mg is preferably one to one and when expressed by the term of weight percent of the total Al-Mg alloy, the ratio useful in the present invention may be as follows:

Al = 35—65 weight percent
Ag = 65—35 weight percent

Any ratio which deviates from the above-mentioned ratio range will produce substantially the same defects as those described in connection of the use of Mg in its simple substance form and is out of the scope of the present invention.

Furthermore, according to the present invention, the powdery denitrification agent comprises as its essential ingredient the specific Al-Mg alloy, that is, the Al-Mg alloy including NaCl and KCl and the amount of the total of NaCl and KCl is of 0.006—0.06 percent by weight of the Al-Mg alloy. The effects and advantages obtainable by the use of such a specific denitrification agent in the flux of the novel wire electrode will be in detail described hereinbelow referring to the accompanying drawing.

DETAILED DESCRIPTION

In order to determine the relationship between the amount of KCl and NaCl contained in the Al-Mg alloy in the flux used in the novel wire electrode and that of N to be contained in a deposit metal, an open-arc automatic welding operation was conducted using a composite wire electrode in the metal sheath of which 20 percent of powdery flux by weight of the total wire electrode was filled and the powdery flux had the following composition:

BY WEIGHT OF THE TOTAL WIRE ELECTRODE $CaF_2$ 8%
$AlF_2$ 1%
MaF 1%
Fe-Mr 0.6%
(70 percent Mn)
$SiO_2$ 0.6%
Iron powder 3.4%
Al-Mg alloy 3.2%
(40% Al)
Ni 1.4%
$CaCO_3$ 0.8%

Figure 1:
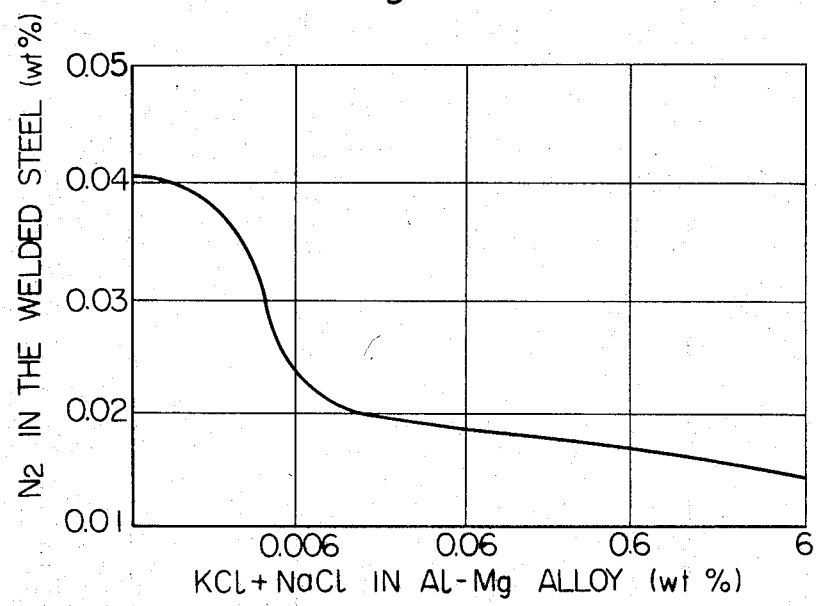
FIG. 1 is a graph showing the relationship between the amount of KCl and NaCl in the Al-Mg alloy used in the novel wire electrode and that of N to be contained in a deposit metal formed by an arc-welding position using the wire electrode.

The result of the welding operation is shown in FIG. 1 and as seen from this FIG., as the amount of KCl + NaCl increases the amount of N to be contained in a deposit metal decreases accordingly. This is supposedly due to the fact that when Al-Mg alloy containing K and Na is used in the flux of the wire electrode, the Mg which has been exposed to the arc is vaporized at the boiling point of 1070° C and coexists with K and Na which serve as ionization agents in the flux thereby to exhibits a strong arc stabilization action and that since the arc is not disturbed and transfer of the molten metal drops at the tip end of the wire electrode to the workpiece can be smoothly realized, the time during which the molten metal drops are exposed to the air will be shortened resulting in decrease of the amount of N to be absorbed into a deposit metal to be formed.

Figure 2:
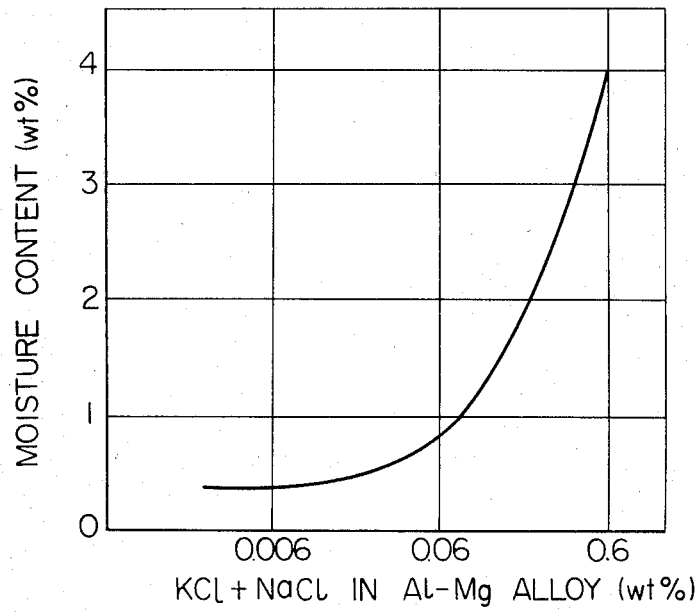
FIG. 2 is a graph showing the relationship between the amount of KCl and NaCl in the Al-Mg alloy used in the novel wire electrode and that of the moisture content to be absorbed in a deposit metal obtained by an arc-welding operation using the wire electrode.

In this way, with the use of the novel consumable composite wire electrode a satisfactory atmosphere shielding effect can be expected for. Therefore, the amount of denitrification powders which are to be blended with the other ingredients of the flux of the wire for the purpose of prevention of formation of air voids in a deposit metal can be reduced without the use of an auxiliary agent such as carbonate and the like whereby adverse effects on the mechanical properties of the deposit metal which will be otherwise inevitable can be effectively prevented resulting in a deposit metal having excellent properties. In order to attain such a result, as seen from FIG. 1, it is necessary that the Al-Mg alloy includes K and KCl and NaCl in the amount of at least 0.006 percent by weight of the Al-Mg alloy. However, if these chlorides are included in a substantial amount in the Al-Mg alloy, the amount of moisture to be absorbed into a deposit metal will increase as seen in FIG. 2. Accordingly, it is necessary not to use these ingredients in excess of the upper limit of the specified amount range or 0.06 percent. The most preferable amount range of these ingredients is 0.006—0.025 percent and in such a case K and Na are preferably used in the ratio of about one to one by weight. And K and Na are preferably employed in the form of carbonates thereof because the addition of these ingredients in their elemental forms to the other ingredients of the Al-Mg alloy is technically difficult and similarly, the addition of these ingredients in their compound forms to the other ingredients of the Al-Mg alloy is also not advisable. When the Al-Mg alloy having the above composition is blended with the other powdery ingredients of the flux of the wire electrode, for the purpose of the present invention, it is necessary that the alloy is used in the amount range 2—5 percent by weight of the total composite wire electrode. The use of the Al-Mg alloy below the lower limit of the prescribed amount range will not exhibit its function as the denitrification agent. On the other hand, the use of the alloy in excess of the upper limit of the prescribed amount range will result in lowering of the ductility of a formed deposit metal. And the use of the Al-Mg alloy in any amount deviating from the prescribed amount range will not attain the purpose to which the present invention is directed.

The following Table 1 shows the results of various welding operations conducted on workpieces using wire electrodes including various Al-Mg alloys which contain Na and K in varying amounts according to the present invention and conventional wire electrodes, respectively and all the welding operations were conducted by the open-arc automatic welding process. The compositions of the welding fluxes in the wire electrodes and welding conditions employed in these operations were as follows:

COMPOSITION OF WELDING FLUX (Excluding Al-Mg Alloy)

CaF$_2$   8—10%
Fe-Mr
(70% Mn)  0.6%
Ni   1%

BY WEIGHT OF THE TOTAL WIRE ELECTRODE

Iron powder   4—8%
SiO$_2$   0—1%

In any of the wire electrodes employed, the total amount of the powdery flux was 21 percent by weight of the total wire electrode.

WELDING CONDITIONS

400 Amp   27 v. (AC)   4 layer finish
Workpieces   Mild steel plates (19 mm. thick) with V-shaped grooves of 50° angle be too high to form a satisfactory bead shape and air voids will develop in the deposit metal as well as increasement of the amount of intervenient substances therein. On the other hand, the amount of CaF$_2$ exceeds 11 percent by weight of the total wire, that is, the upper limit of the amount range prescribed for the ingredient, the viscosity of slag formed will be too low to cause the slag to envelope the deposit metal resulting in unsatisfactory workability. The Mn contained in the novel wire electrode flux serves as a conventional deoxidization agent and the amount of the Mn usually must vary depending upon the strength required for a structure to be welded in order to cause the amount of the ingredient to conform with the required strength of the structure. In the novel wire electrode, the amount of Mn employed is preferable and practicable within the range 0.1—1.5 percent by weight of the total wire electrode. The Ni employed in the novel wire electrode flux serves as the so-called austenite former and as the amount of Al which is the ferrite former increases, the austenite former reduces the size of the crystal particles of a deposit metal so as to increase the strength and stabilize the impact value of the deposit metal. Although the amount of Ni to be employed in the novel wire electrode flux may vary depending upon the amount of the Al-Mg alloy employed in the wire flux, when the Al-Mg alloy is employed in the amount range 2—5 percent by weight of the total wire electrode the Ni is preferably employed in the amount range 0.8—2 percent by weight of the total wire. If the amount of the Ni to be employed in the wire

TABLE 1

| Wire Number: | Amount of NaClKCl in Al-Mg alloy, by weight percent | Blending amount of Al-Mg alloy, by weight percent | Amount of Al absorbed in deposit metal, by weight percent | Amount of N absorbed in deposit metal, by weight percent | X-ray JIS grade | Impact value |
| --- | --- | --- | --- | --- | --- | --- |
| 1 | t | 5.6 | 1.48 | 0.038 | 1 | 4.1 |
| 2 | 0.003 | 4.8 | 1.05 | 0.037 | 4 | 8.0 |
| 3 | 0.006 | 3.6 | 0.71 | 0.020 | 1 | 11.0 |
| 4 | 0.01 | 3.6 | 0.70 | 0.019 | 1 | 11.3 |
| 5 | 0.02 | 2.8 | 0.55 | 0.020 | 1 | 19.7 |
| 6 | 0.06 | 3.6 | 0.72 | 0.018 | 1 | 10.5 |
| 7 | 0.30 | 2.4 | 0.49 | 0.017 | 5 | 20.6 |
| 8 | 0.30 | 3.6 | 0.73 | 0.016 | 6 | 10.4 |

NOTE.—Nos. 3-6 were the novel composite wire electrodes.

As seen from the above Table 1, when welding operations were conducted using composite wire electrodes including Al-Mg alloys which contain neither Na nor K (Nos. 1 and 2 wire electrodes), it was found that formed deposit metals had grave defects with respect to X-ray properties and impact value and the deposit metals were not practically useful. On the contrary, when welding operations were conducted using novel composite wire electrodes, it was confirmed that deposit metals having excellent properties could be formed. Deposit metals obtained by the use of Nos. 7 and 8 wire electrodes had absorbed substantial amounts of moisture and low X-ray properties.

And the reason for which the use of CaF$_2$, Mn and Ni in addition to Al-Mg alloy in the novel composite wire electrode are as follows:

As fluorides, although there are a great variety of substances other than CaF$_2$, CaF$_2$ is preferably over other fluorides because the CaF$_2$ when used in the novel wire electrode improves the fluidity and workability of slag and especially accelerates the enveloping action and removal of slag. The amount of CaF$_2$ to be blended with the other ingredients of the flux of in the novel wire electrode may vary depending upon the amount of the Al-Mg contained in the wire flux, when the wire flux contains the Al-Mg alloy in the amount of 2—5 percent by weight of the total wire, CaF$_2$ may be employed in the amount of 6—11 percent by weight of the total wire. If the amount of the CaF$_2$ is less than 6 percent by weight of the total wire, that is, the lower limit of the amount range prescribed for the ingredient, the viscosity of slag formed will flux is less than 0.8 percent, that is, the lower limit described for the ingredient, the anticrack property of a deposit metal formed will be low.

In addition to the above-mentioned ingredients, the novel wire electrode flux sometimes may contain elements such as Al Zr and Ti or alloys thereof as the auxiliary denitrification agents, elements such as Si, Cr, Mo, B, V, W, C and Cu or alloys thereof as alloying ingredients and TiO$_2$, SiO$_2$, Al$_2$O$_3$, ZrO$_2$, MgO, MnO, MnO$_2$, K2O, Na2O, CaCO$_3$, MgCO$_3$ and BaCO$_3$ as auxiliary slag forming agents and/or Fe as melting accelerating metal.

According to the present invention, it is necessary that the amount of the powdery flux in the composite wire electrode be maintained within the range 10—40 percent by weight of the total wire electrode and the total amount of CaF2-Mn-Ni-Al.Mg which are essential ingredients of the novel wire electrode flux be at least 55 percent by weight of the total wire electrode as 100 percent. Accordingly, the novel wire electrode flux may comprise only these four essential ingredients, but in addition to these four ingredients, when the wire electrode flux further contains the above-mentioned auxiliary ingredients the total amount of the auxiliary ingredients must be less than (100—55) percent by weight of the total wire electrode. And the amount of the auxiliary denitrification agent ingredients which are added to the primary denitrification agent ingredients must be less than 1 percent by weight of the total wire electrode, the amount of the alloying elements must be less than 1 percent by weight of the total wire electrode, the amount of the auxiliary slag forming agent ingredients must be less than 2 percent by weight of the total wire electrode and finally the amount of iron powder must be less than 18 percent by weight of the total wire electrode.

On the other hand, the metal sheath of the composite wire electrode may be formed by either carbon steel or low carbon steel as desired and the composition of the metal sheath is not limited to any specific one. However, usually the metal sheath is formed by shaping a hooped blank into a tubular shape and therefore, the metal sheath is preferably made from an easily processible material such as mild steel. The shape of the metal sheath of the composite wire electrode is not limited to a simple pipe shape, but may be of any other more complicated cross section configuration such as that having inwardly and radially extending fins, for example.

The following is the most pertinent examples of this invention.

EXAMPLE 1

Composition of wire:
A wire electrode, 3.2 mm. in diameter made of 0.2 × 23 mm. mild steel hoop containing 0.03 percent of C, 0.35 percent of Mn and 0.01 percent of Si, which includes fluxes of the following amounts by weight of the total wire.
$CaF_2$   10   wt%
Mn   0.5   wt%
Al-Mg   3   wt% (Al 50% chloride 0.01%)
Ni   1.5
Welding conditions:
Workpieces   Mild steel plates (25 mm. thick)
400 Amp.   26v.   Buttwelding.
Result:
X-Ray property   no defect
Tensile strength   52 Kg./mm.$^2$
Impact value   16.5 Kg. m.

EXAMPLE 2

Composition of wire:
A wire electrode, 3.2 mm. in diameter, made of mild steel identical to that of Example 1, which includes fluxes of the following amounts by weight of the total wire.
$CaF_2$   8   wt%
Fe-Mn   1   wt% (Mn 70 percent)
Al-Mg   3.5   wt% (Al 40% chloride 0.02%)
Ni   1   wt%
Fe (powder)   6   wt%
Welding conditions:
Workpieces   Mild steel plates (25mm. thick)
380 Amp.   25 v.   Buttwelding
Result:
X-Ray property   no defect
Tensile strength   51 Kg./mm.$^2$
Bending test   good
Impact value   15 Kg. m.

EXAMPLE 3

Composition of wire:
A wire electrode, 3.2 mm. in diameter, made of mild steel identical to that of Example 1, which includes fluxes of the following amounts by weight of the total wire.
$CaF_2$   7   wt%
Mn   0.3   wt%
Al-Mg   2.5   wt% (Al 60% chloride 0.03%)
Fe-Zr   1   wt%
Ni   1   wt%
Fe (powder)   11   wt%
Welding conditions:
Workpieces   Mild steel plates (19mm. thick)
400A.   27 V.   Buttwelding
Results:
X-Ray property   no defect
Tensile strength   54 Kg./mm.$^2$
Impact value   18 Kg. m.

EXAMPLE 4

Composition of wire:
A wire electrode, 2.4 mm. in diameter, made of 0.2 ×17 mm. mild steel hoop containing 0.04 percent of C, 0.37 percent of Mn and 0.01 percent of Si, which includes fluxes of the following amounts by weight of the total wire.
$CaF_2$   12   wt%
Fe-Mn   0.5   wt% (Mn 70 percent)
Al-Mg   3   wt% (Al 50% chloride 0.02%)
Ni   1   wt%
CaO   1.5   wt%
Fe (powder)   4   wt%
Welding conditions:
Workpieces   Mild steel plates (16mm. thick)
400 Amp. 26 V. Horizontal fillet welding
Results:
Work efficiency   excellent
Outline of bead   excellent
Structure   no defect From the foregoing, it will be understood that since the novel composite wire electrode flux contains the above-mentioned specific Al-Mg alloy blended therein in the above-mentioned specific Al-Mg alloy blended therein in the above-described amount range, the amount of N to be contained in a deposit metal can be made less than that in a deposit metal formed by any convention composite wire electrode and in addition, the total amount of the denitrification agent to be contained in the wire electrode flux can be made less than that in a deposit metal formed by any conventional wire electrode whereby the ductility in the notch in a deposite metal can be significantly improved over that obtainable by any conventional wire electrode. Thus, the novel composite wire effectively eliminates the defects experienced with the use of the conventional open-type automatic submerged arc-welding composite wire electrodes and has a great industrial value.

Although the best mode contemplated for carrying out the present invention has been herein shown and described, it will be apparent to those skilled in the art that modification and variation may be made without departing from what is regarded to be the subject matter of the invention as set forth in the appended claims.

We claim:

1. A composite wire electrode for use in open-type arc-welding of steel without shielding gas, comprising a metal sheath and a powdery flux filled in said sheath, said flux essentially comprising by weight of the total wire electrode, respectively 6—14 percent of $CaF_2$, 0.1—1.5 percent of Mn, 0.8—2 percent of Ni and 2—5 percent of Al-Mg alloy containing NaCl and KCl in the total amount of 0.006—0.06 percent by weight of the Al-Mg alloy.

2. A composite wire electrode for use in arc-welding of steel without shielding gas as set forth in claim 1, said powdery flux further comprising one or more members selected from the group comprising Ti, Zr and the like as denitrification element or elements.

3. A composite wire electrode for use in arc-welding of steel without shielding gas as set forth in claim 1, said powdery flux further comprising one or more members selected from the group comprising Si, Cr, Co, B, V, W, C, Cu as alloying element or elements.

4. A composite wire electrode for use in arc-welding of steel without shielding gas as set forth in claim 1, said powdery flux further comprising one or more members selected from the group comprising $TiO_2$, $SiO_2$, $Al_2O_3$, $ZrO_2$, MgO, CaO, MnO, $MnO_2$, $K_{20}$, $Na_{20}$, $CaCo_3$, $MgCO_3$ and $BaCO_3$.

5. A composite wire electrode for use in arc-welding of steel without shielding gas as set forth in claim 1, said powdery flux further comprising Fe powder in the amount of 2—18 percent by weight of the total wire electrode as one ingredient of the flux composition of said wire electrode.

6. A composite wire electrode for use in open-type arc-welding of steel without shielding gas as set forth in claim 1, said powdery flux in said metal sheath being in the amount of 10—40 percent by weight of the total wire electrode and in said Al-Mg alloy Al is 35—65 percent and Mg is 56—35 percent by weight of the total wire electrode and the total amount of contained in said Al-Mg alloy is 0.006—0.025 percent by weight of said Al-Mg alloy.